United States Patent
Igarashi et al.

(10) Patent No.: US 7,281,423 B2
(45) Date of Patent: *Oct. 16, 2007

(54) CHARACTERISTICS ADJUSTING APPARATUS OF PHYSICAL QUANTITY SENSING DEVICE AND A THERMAL TYPE AIR FLOW MEASURING INSTRUMENT, AND ASSOCIATED ADJUSTING METHOD

(75) Inventors: Shinya Igarashi, Naka-machi (JP); Kaoru Uchiyama, Omiya-machi (JP); Hitoshi Ishikawa, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 18 days.

This patent is subject to a terminal disclaimer.

(21) Appl. No.: 10/806,291

(22) Filed: Mar. 23, 2004

(65) Prior Publication Data

US 2004/0177684 A1    Sep. 16, 2004

Related U.S. Application Data

(63) Continuation of application No. 10/458,246, filed on Jun. 11, 2003, now Pat. No. 6,725,715, which is a continuation of application No. 10/316,057, filed on Dec. 11, 2002, now Pat. No. 6,598,472, which is a continuation of application No. 09/867,665, filed on May 31, 2001, now Pat. No. 6,510,735, which is a continuation of application No. 09/524,763, filed on Mar. 13, 2000, now abandoned, which is a continuation of application No. 08/900,517, filed on Jul. 25, 1997, now Pat. No. 6,070,462.

(30) Foreign Application Priority Data

Jul. 25, 1996   (JP)   ................... 8-195973

(51) Int. Cl.
G01F 1/68   (2006.01)

(52) U.S. Cl. ............... 73/204.11; 73/204.23; 73/204.25

(58) Field of Classification Search ............ 73/204.22, 73/756, 753, 204.23, 204.25
See application file for complete search history.

(56) References Cited

U.S. PATENT DOCUMENTS 4,106,350 A * 8/1978 Morris et al. ................ 73/755

(Continued)

FOREIGN PATENT DOCUMENTS

DE    44 26 102 A1    1/1996

(Continued)

OTHER PUBLICATIONS

Japanese Office Action Dated Dec. 13, 2005 (One (1) page).

*Primary Examiner*—Andre J. Allen
(74) *Attorney, Agent, or Firm*—Crowell & Moring LLP

(57) ABSTRACT

The output characteristics of the sensing device or the control quantity of the sensing element can be adjusted by extracting an adjusting terminal in addition to a power source terminal, a ground terminal, an output terminal and the like outside a housing containing and protecting an electronic circuit. Further, by arranging the adjusting terminal inside a connector housing containing terminals such as the power source terminal, the ground terminal, the output terminal and the like, it is possible to prevent contact of foreign objects to the adjusting terminal and to water-proof the terminals for preventing corrosion since an associated connector is attached to the connector when the sensing device is actually used.

26 Claims, 8 Drawing Sheets

U.S. PATENT DOCUMENTS

| | | | |
|---|---|---|---|
| 4,304,128 A * | 12/1981 | Hafner et al. | 73/204.22 |
| 4,337,822 A * | 7/1982 | Hyltin et al. | 165/265 |
| 4,400,974 A * | 8/1983 | Nishimura et al. | 73/204.15 |
| 4,685,324 A * | 8/1987 | Bourdon et al. | 73/204.15 |
| 4,873,655 A * | 10/1989 | Kondraske | 73/1.88 |
| 4,884,215 A * | 11/1989 | Zboralski et al. | 73/118.2 |
| 4,918,973 A * | 4/1990 | Kruse | 73/1.34 |
| 5,186,044 A * | 2/1993 | Igarashi et al. | 73/118.2 |
| 5,329,117 A * | 7/1994 | Galili et al. | 250/221 |
| 5,371,686 A * | 12/1994 | Nabity et al. | 73/861.25 |
| 5,509,306 A * | 4/1996 | Yamamoto et al. | 73/204.15 |
| 5,630,411 A * | 5/1997 | Holscher | 128/205.24 |
| 5,681,989 A * | 10/1997 | Kanke et al. | 73/118.2 |
| 6,070,462 A * | 6/2000 | Igarashi et al. | 73/204.22 |
| 6,510,735 B2 * | 1/2003 | Igarashi et al. | 73/204.22 |
| 6,598,472 B2 * | 7/2003 | Igarashi et al. | 73/204.22 |
| 6,725,715 B2 * | 4/2004 | Igarashi et al. | 73/204.22 |

FOREIGN PATENT DOCUMENTS

| | | | | |
|---|---|---|---|---|
| EP | 0 459 723 A2 | 12/1990 | | |
| EP | 0 589 211 A2 | 3/1994 | | |
| EP | 0 628 715 A2 | 12/1994 | | |
| EP | 0 657 722 | 6/1995 | | |
| FR | 2 439 388 | 5/1980 | | |
| JP | 58-28621 | * | 2/1983 | 73/204.15 |
| JP | 3-255917 A | 11/1991 | | |
| JP | 5-53160 U | 7/1993 | | |
| JP | 5-312613 A | 11/1993 | | |
| JP | 5312613 | 11/1993 | | |
| JP | 5-340958 | 12/1993 | | |

* cited by examiner

100
CHARACTERISTICS ADJUSTING APPARATUS OF PHYSICAL QUANTITY SENSING DEVICE AND A THERMAL TYPE AIR FLOW MEASURING INSTRUMENT, AND ASSOCIATED ADJUSTING METHOD

This application is a continuation of application Ser. No. 10/458,246, filed Jun. 11, 2003, U.S. Pat. No. 6,725,715 which is a continuation of 10/316,057, filed Dec. 11, 2002, now patented as U.S. Pat. No. 6,598,472, which is a continuation of 09/867,665, filed May 31, 2001, now patented as U.S. Pat. No. 6,510,735, which is a continuation of 09/524,763, filed Mar. 13, 2000, now abandoned which is a continuation of 08/900,517, filed Jul. 25, 1997, now patented as U.S. Pat. No. 6,070,462.

BACKGROUND OF THE INVENTION

The present invention relates to a sensing device for detecting various kinds of physical quantities, and more particularly to a sensing device having a function for adjusting output characteristics of the sensing device or a control state of a sensing element.

A known way of adjusting output characteristics of an acceleration sensing device by applying an electric signal to an adjusting terminal is disclosed in Japanese Patent Application Laid-Open No. 5-340958. The acceleration sensor has an acceleration detection processing circuit provided with a sensitivity adjusting unit and a zero-point adjusting unit, and an adjusting unit capable of varying a basic output characteristic of sensitivity. The adjusting unit is constructed of a plurality of resistors and switches, and on-off operation of the switch is performed by external on-chip trimming.

In the prior art described above, the adjusting terminals capable of performing on-off operation of the adjusting switches are provided on an electronic circuit board, and in a fabrication process of the product there are a filling process of a gel into a housing having the circuit board inside after adjusting the output characteristic and heating processes for bonding a cover and setting the gel and the cover adhesive. Variations of output characteristics in the final products are caused by variations of output characteristics caused by the process.

Further, in an air flow measuring instrument for an internal combustion engine, in order to make it small in size, light in weight and low in cost, it is preferable that an air flow sensing unit is integrated in a housing containing a circuit board inside, and the housing is inserted and mounted so that the sensing device is positioned in an air intake flow passage of the internal combustion engine. Since the adjusting work needs to be performed by actually flowing air through the flow sensing unit, the air flow measuring instrument is mounted on a rig corresponding to the air intake flow passage after almost completing the housing and the flow sensing unit, and adjusting work is performed from the outside of the rig by actually flowing air. Apparatus capable of performing such adjusting work is necessary.

Particularly, in a thermal type air flow measuring instrument, the sensing element can be made small in size and the sensing element needs to be electrically connected to an electronic circuit for controlling the sensing element and outputting. Therefore, it is possible to provide a small-sized and low-cost air flow measuring instrument in which a flow sensing unit is integrated in a housing containing an electronic circuit. However, since the electronic circuit is also placed in the air intake flow passage, adjusting work is performed from the outside of the air intake flow passage when the adjusting work is performed by actually flowing air through the flow sensing unit. Here again, apparatus capable of performing such adjusting work is necessary. Further, in a case where the sensing element is placed in an auxiliary passage from the viewpoint of various kinds of performance and reliability, in taking it into consideration making the instrument small in size and low in cost, the number of parts is reduced by forming the auxiliary passage in the housing and forming the auxiliary passage by the cover of the housing. However, in taking into consideration the effect of variations in shapes of the auxiliary passage on the output characteristics, it is necessary to perform adjustment by actually flowing air after completion of the auxiliary passage, and apparatus capable of adjusting from external is further required.

SUMMARY OF THE INVENTION

An object of the present invention is to provide a highly accurate sensing device, the characteristic adjustment of which can be performed in a final, i.e. the last, process step.

Another object of the present invention is to provide a low-cost sensing device in which the sensing elements and the electronic circuit are integrated to reduce the number of parts, the size and the weight, and it is possible to easily perform the characteristic adjustment of the sensing device.

Another object of the present invention is to provide a sensing device, which is suitable for the environment of actual use, and in which the characteristic adjustment can be performed under a state that the sensing device is set in the environment of actual use.

In the present invention, for example, adjustment of output characteristic can be performed in the final process in production of the devices as products, and occurrence of the variations of the products due to change in the output characteristic in such processes as filling the gel and bonding the cover is suppressed.

In order to solve the above-mentioned problems and to achieve the above objects, in addition to the electric power supply, ground and output terminals which are provided in a common sensing device, an output characteristic adjusting terminal of the sensing device or a control quantity adjusting terminal of a sensing element is provided outside a housing for containing an electronic circuit inside.

Further, in order to prevent problems such as corrosion of the terminals or short-circuit caused by coming in contact with a conductive material under the environment of actual use of the sensing device, the adjusting terminal is covered with adhesive or the like, or the adjusting terminal is arranged inside a connector housing containing the electric power supply, ground and output terminals so that foreign objects are prevented from coming in contacting with the terminals and the connector housing becomes a water-proof place under the environment of actual use in which the associating connector is connected. In that case, by arranging the adjusting terminal at a lower (deeper) level to the depth direction of the connector housing than the level of the power source terminal etc., it is possible to prevent the power source terminal etc. from coming in contact with another thing, for example, contact with a probe during adjusting work or contact with an associating connector when the associating connector is connected. Further, by arranging the adjusting terminal in a hole provided on the bottom of the connector housing, it is possible to prevent electrical short-circuit during adjusting work with more certainty.

DESCRIPTION OF PREFERRED EMBODIMENTS

In the present invention, thermal type air flow measuring instruments are shown as typical embodiments. Since the other kinds of physical quantity sensing devices are basically the same as the thermal type air flow measuring instrument only except for their particular sensing element and arranging method, a description of other types of embodiments will be omitted.

Figure 1:
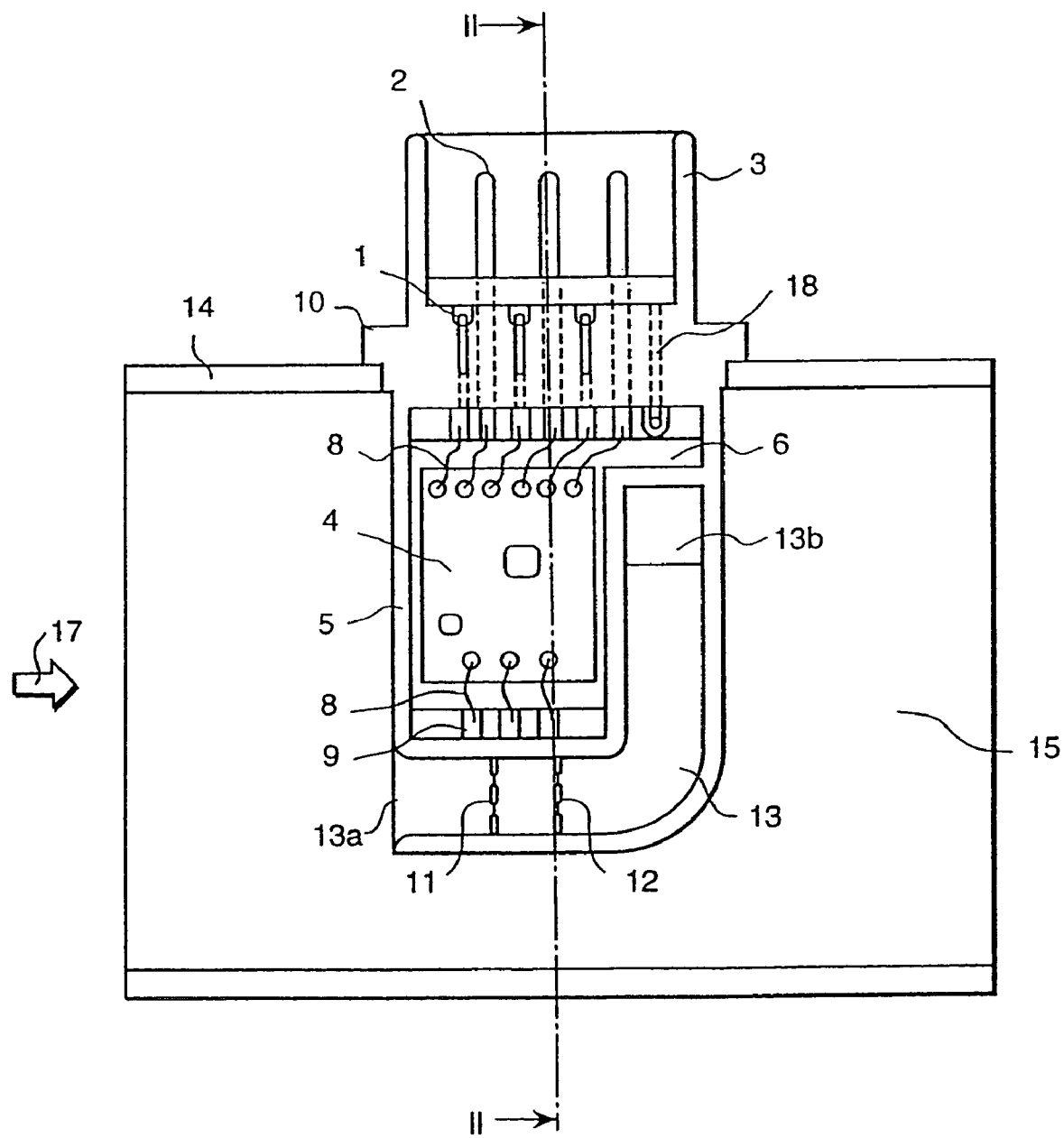
FIG. 1 is a cross-sectional side view showing an embodiment of a sensing device in accordance with the present invention.
Figure 2:
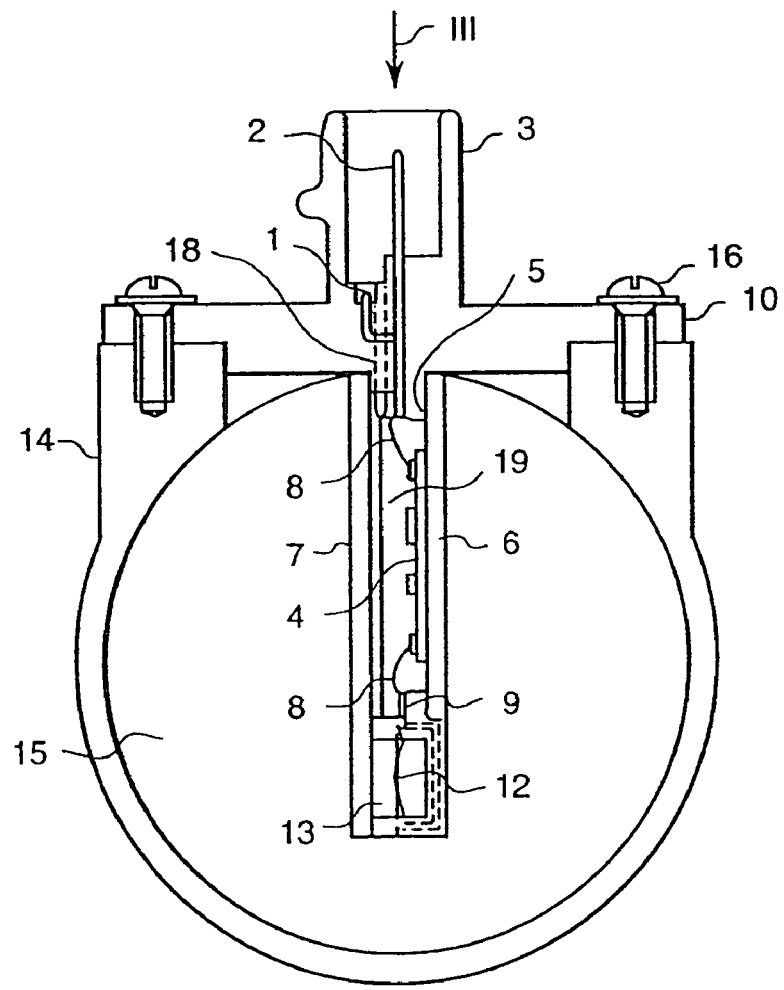
FIG. 2 is a view showing the sensing device being taken on the plane of the line II-II of FIG. 1.
Figure 3:
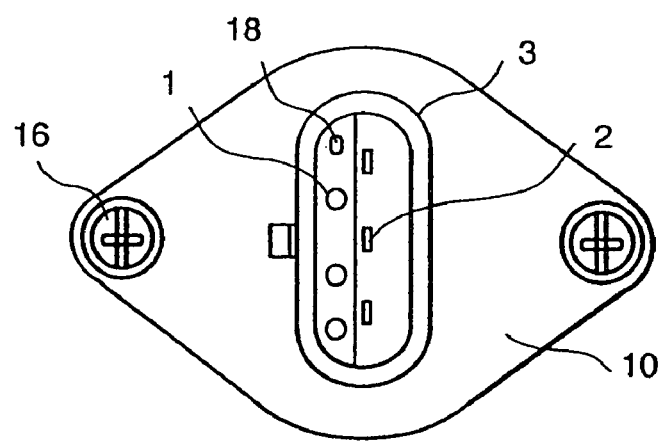
FIG. 3 is an external view showing the sensing device seeing from the arrow III of FIG. 2.

Referring first to FIGS. 1-3, an electronic circuit 4 is bonded and fixed onto a metallic base 6, and surrounded by a housing 5 which is also bonded and fixed to the metallic base 6 or insert-formed in a unit with the metallic base 6.

The housing 5 is a plastic part which is insert-formed with metallic parts of connector terminals 2, adjusting terminals 1 and sensing element terminals 9 (the metallic base 6 may be also insert-formed, as described above). In addition to a function to contain and protect an electronic circuit 4, the housing 5 is integrated in a unit together with an auxiliary passage 13, a connector housing 3, a fixing flange 10, etc. Therefore, the electronic circuit 4 is contained in a box-shaped body composed of the metallic base 6 as the bottom and the housing 5 as side walls. The adjusting terminals 1 and the connector terminals 2 penetrate from the inner side of the box-shaped body containing the electronic circuit 4 to the inside portion of the connector housing 3. By connecting the terminal near an inner side end of the housing 5 and the electronic circuit 4 with metallic wires 8, the electronic circuit 4, the adjusting terminals 1 and the connector terminals 2 inside the connector housing 3 are electrically connected. Similarly, the sensing terminals 9 penetrate from the inner side of the box-shaped body containing the electronic circuit 4 to the auxiliary passage 13. By connecting the terminals near the other end of the inner side of the housing 5 and the electronic circuit 4 with metallic wires 8, and by welding a heating resistor 11 and a temperature compensating resistor 12 to the sensing terminals 9 in a side end portion of the auxiliary passage 13, the heating resistor 11 and the temperature compensating resistor 12 are brought in electrical continuity with the electronic circuit 4. Then, the interior of the box-shaped body containing the electronic circuit 4 is filled with a silicon gel 19, and the electronic circuit 4 is sealed by bonding a cover 7 (actually, the box-shaped body is opened only through a ventilation hole 18 for leaking air remaining inside the housing 5 to the inner side of the connector housing 3 when the air is heated and expanded). The terminals except for the connector terminal 2, the adjusting terminals 1 and the sensing element terminals 9 are electrically insulated. Further, by bonding the cover 7, the auxiliary passage 13 is completed as a passage having an opening upstream of the housing 5 as an inlet 13a and a square hole bored in the housing 5 and the cover 7 as an outlet 13b. The reason why the auxiliary passage 13 is formed in such a complex-shaped passage having a bend as shown in this embodiment is that the structure is effective in preventing the sensing elements from fouling, suppressing air flow disturbance and reducing sensing error due to pulsating flow, and therefore the structure is suitable for intake air sensing of an internal combustion engine. This module is inserted through a hole in an outer wall surface of a body 14 and attached so that the inlet 13a and the outlet 13b of the auxiliary passage 13 are positioned inside the main passage 15, and a fixing flange 10 integrally formed in the housing 5 is fixed onto the body 14 using screws 16. Thus, the structure of the thermal type air flow measuring instrument is completed.

By employing this structure, it is possible to reduce the number of parts and largely reduce the cost. Further, even though the auxiliary passage employs such a complex structure as to have the bend, the housing 5 can be formed easily through plastic forming, and can be very small in size, light in weight, small in the number of parts and low cost. Furthermore, the thermal type air flow measuring instrument can be inserted and mounted to an existing component of an air intake system such as an air cleaner without setting such a body described above.

Measured air flow rate is the total flow rate of air flowing in the main passage 15 in the body 14 in the main flow direction. The total flow rate is detected based on an amount of heat radiated from the heating resistor 11 arranged inside the auxiliary passage 13 into which part of air flowing in the main passage flows. Therefore, since the measuring accuracy is affected by variations existing among the products such as variations in structures of the heating resistor 11, in shapes of the passage, in elements of the electronic circuit and so on, it is necessary to individually adjust output characteristics of the products.

In an embodiment where the adjusting terminals are arranged on the electronic circuit or the characteristic adjustment is performed by laser trimming of a resistor or the like as in the prior art, it is impossible to perform the adjustment after completion of the structure of a thermal type air flow measuring instrument as in the present invention. Accordingly, the adjustment cannot be performed in a state where the electronic circuit 4 is exposed at a time before the cover 7 is bonded. Therefore, since the processes of filling of the silicon gel 19, bonding of the cover and thermo-setting to the box-shaped body of the housing 5 containing the electronic circuit 4 are required after performing adjustment, changes in characteristic due to these processes are a factor to cause variations among the products and degrade them. However, in the present invention, since characteristic adjustment can be performed by applying electric signals to the adjusting terminals 1 provided inside the connector housing after completion of the structure, the adjusting work can be performed in the final process and consequently characteristic changes after adjusting can be eliminated. Further, since shipping inspection may be eliminated or shipping inspection may be performed in the adjusting process, the inspection process can be easily performed.

Furthermore, in the thermal type air flow measuring instrument, the characteristic adjustment needs to be performed by actually flowing air. Particularly, in this embodiment, it is preferable that the characteristic adjustment is performed with the final construction of the product by flowing air to the main passage 15 under a state in which it is attached to the body 14. Therefore, in the conventional technology, the structure having the electronic circuit 4 inside the body 14 has been very difficult to adjust by flowing air through the main passage 15. However, according to the present invention, adjustment can be easily performed using the adjusting terminal 1 inside the connector housing 3 arranged outside the body 14, as described above. Further, in the thermal type air flow measuring instrument, in order that an air flow rate can be measured based on an amount of heat radiated from the heating resistor to the air, the heating resistor 11 is heating-controlled by the electronic circuit 4 so as to keep a constant temperature difference to the temperature compensating resistor 12. Since variations in the amounts of heats among the products occur, adjustment of the electronic circuit 4 is also required. In the present invention, it is also possible to adjust such a control quantity of the sensing element easily, as described above.

In an actual adjusting process, the connector terminal 2 and a line adjusting apparatus need to be electrically connected in order to drive the thermal type air flow measuring instrument to measure its output, and the adjusting terminal 1 and the line adjusting apparatus need to be electrically connected in order to apply an electric signal to the adjusting terminal 1. Since these connections are temporary for only adjusting work, the adjusting work is usually performed by pressing probes provided in the line adjusting apparatus pressed to the individual terminals. In this embodiment, since all the terminals are arranged inside the connector housing 3, the connection is easily performed by pressing all the probes in the same direction. However, on the contrary, since there are many terminals in a narrow space, erroneous contact between the terminals and the probes may be caused. Therefore, the adjusting terminal 1 is arranged in a deeper portion of the connector housing 3 so that the power source probe may not reach the adjusting terminal 1. In addition, the adjusting terminal 1 is arranged in a hole formed on the bottom surface of the connector housing 3 so that only the probe having a top front diameter smaller than that of the hole can be connected to the adjusting terminal 1. Further, by insulating the outer periphery of the probe for the adjusting terminal, it is possible to eliminate electric short-circuiting caused by contact with the connector terminal 2 or the other probes.

In practical use of the thermal type air flow measuring instrument, the inside of the connector housing is usually water-proofed by connecting an associated connector to the connector terminal 2 and also connecting an associated connector to the connector housing 3. Thereby, problems of corrosion of the adjusting terminal 1 and electrical short-circuiting with the other terminals are prevented.

The construction of the electronic circuit in accordance with the present invention will be described below, referring to FIG. 4 to FIG. 6.

Figure 4:
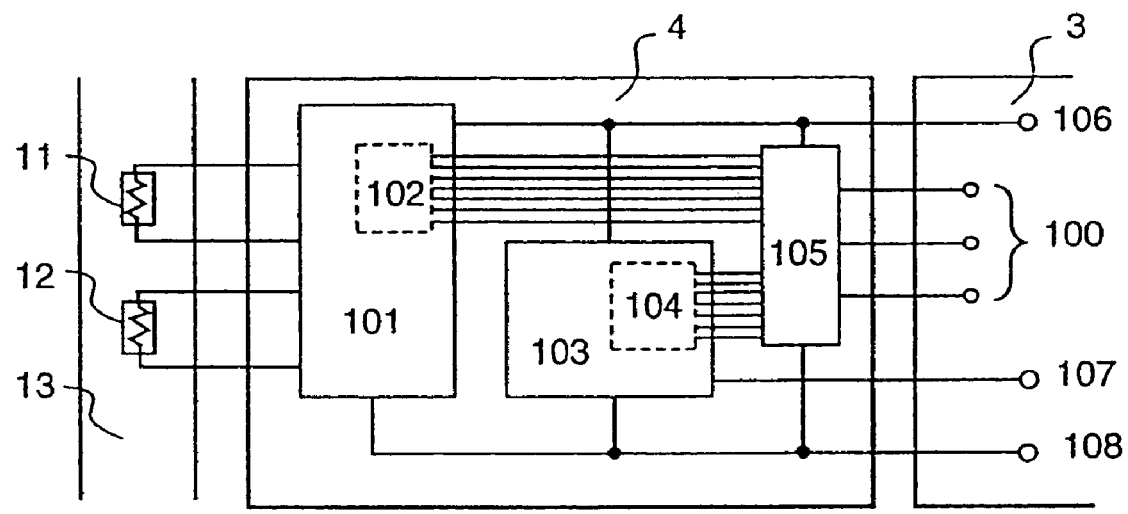
FIG. 4 is a diagram showing the construction of an embodiment of a circuit in accordance with the present invention.

In the embodiment shown in FIG. 4, a transmitting system is switched by an electric signal applied to an adjusting terminal 100 using a multiplexer 105 to perform adjustment of an output characteristic and sensing element control quantity using an output characteristic adjusting circuit 104 and a control quantity adjusting circuit 102.

The electronic circuit 4 can be roughly classified into a control circuit 101, an output processing circuit 103 and the multiplexer 105. The control circuit 101 is electrically connected to the heating resistor 11 and the temperature compensating resistor 12 arranged in the auxiliary passage 13. Further, the control circuit 101 has the control quantity adjusting circuit 102. The output processing circuit 103 is a circuit for converting an electric signal obtained from the control circuit 101 into a predetermined output signal, and has the output characteristic adjusting circuit 104. The power source terminal 106, the output terminal 107 and the ground terminal 108 are arranged in the connector housing 3 and connected to external units.

Figure 5:
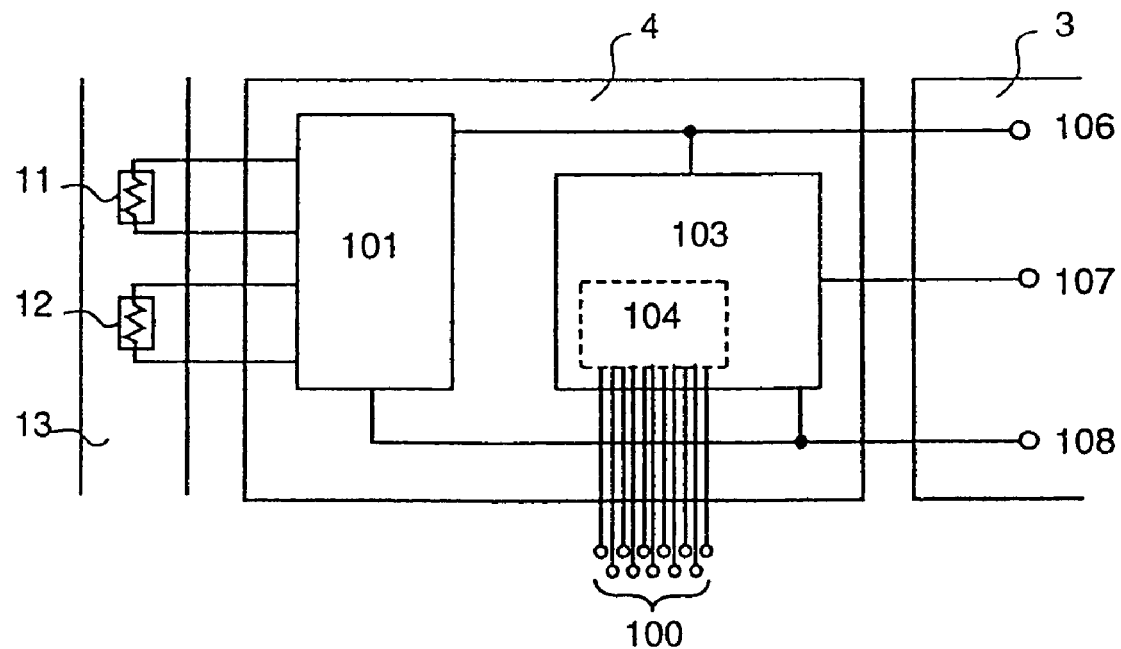
FIG. 5 is a diagram showing the construction of another embodiment of a circuit in accordance with the present invention.

Different from that of FIG. 4, the embodiment of FIG. 5 has no multiplexer, but can adjust only output characteristic from the outside of the electronic circuit 4.

The electronic circuit 4 can be roughly classified into a control circuit 101 and an output processing circuit 103, and the output processing circuit has a output characteristic adjusting circuit 104. The output characteristic adjusting circuit 104 is a circuit capable of adjusting output characteristic by switching on-off, and the switching on-off can be performed by applying an electric signal to the adjusting terminal 100. The adjusting terminal 100 is extended outside the electronic circuit 4 so that the electric signal can be applied from the outside of the housing containing and protecting the electronic circuit 4.

Figure 6:
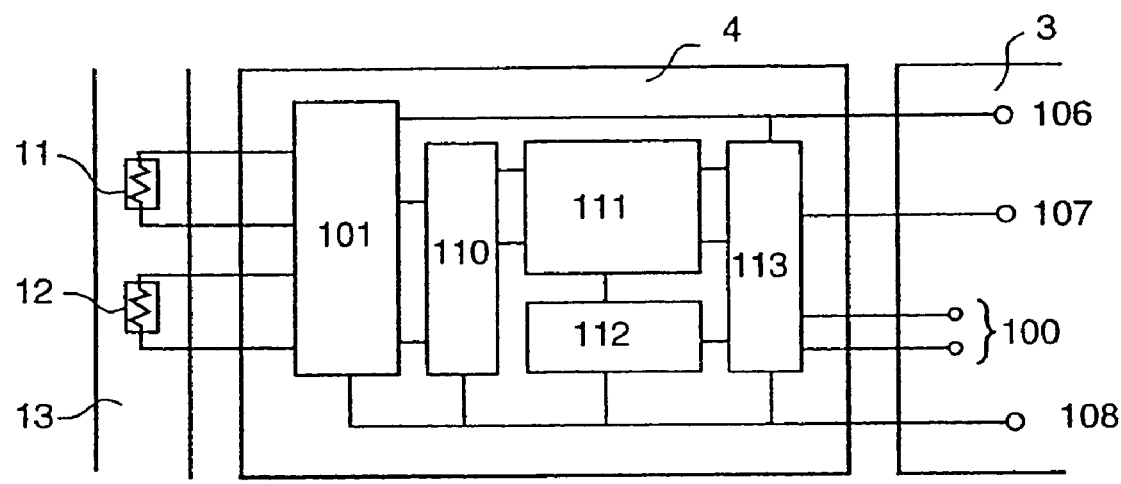
FIG. 6 is a diagram showing the construction of a further embodiment of a circuit in accordance with the present invention.

In the embodiment of FIG. 6, output processing is performed by a microcomputer (CPU) 111. The electronic circuit 4 can be roughly classified into a control circuit 101, an A/D converter 110, the CPU 111, a memory 112 and an interface 113. The control circuit 101 is electrically connected to a heating resistor 11 and a temperature compensating resistor 12 as in the embodiments of FIG. 4 and FIG. 5, and the control may be employ not only analog control but digital control as well. The A/D converter 110 converts an electric signal of the control circuit 101 into a digital signal. The CPU 111 performs calculation by processing the digital signal based on data stored in the memory 112 to convert the digital signal into an appropriate signal, and the output signal is output as a signal matching an external unit receiving the signal using the interface circuit 113.

Therefore, in this embodiment, the characteristic adjustment can be performed by storing optimized values in the memory.

When resolution of output characteristic adjustment is increased in the circuit construction described in FIG. 5, the number of adjusting terminals is increased. Therefore, it becomes difficult from the viewpoint of space to arrange all the adjusting terminals inside the connector housing as in the embodiments explained by FIG. 1 to FIG. 3.

Therefore, description will be made below on an embodiment where the adjusting terminals are arranged outside a connector housing, referring to FIG. 7 and FIG. 8. Since the construction of the thermal type air flow measuring instrument is the same as the embodiments of FIG. 1 and FIG. 2, description of the instrument will be omitted here.

Figure 7:
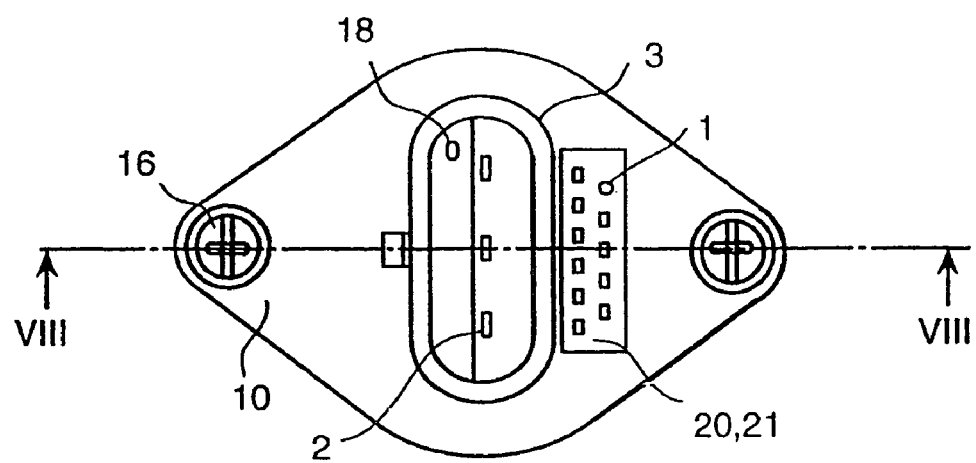
FIG. 7 is an external view showing another embodiment of a sensing device in accordance with the present invention viewed in the direction of the arrow III in FIG. 2.
Figure 8:
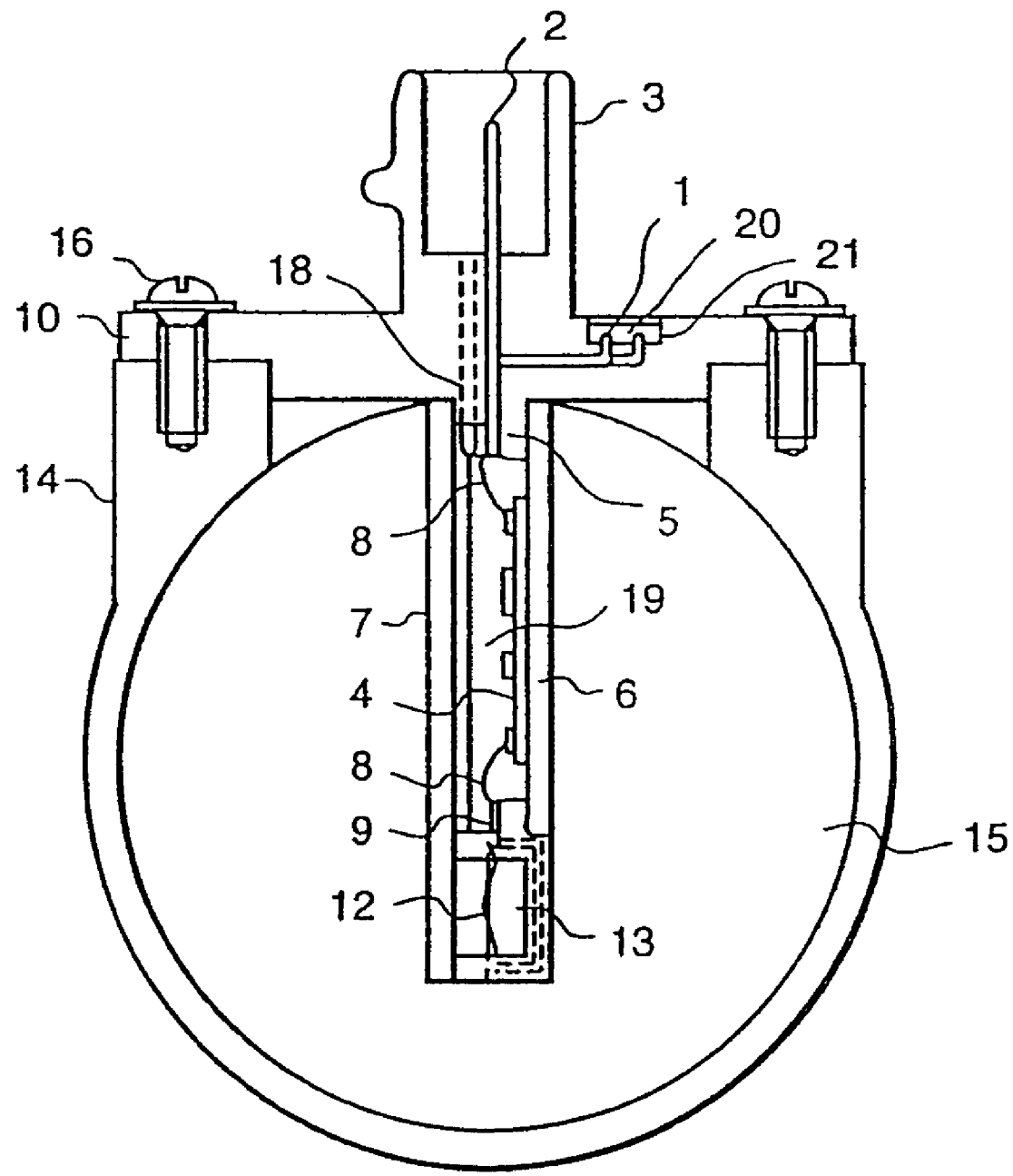
FIG. 8 is a view showing the sensing device being taken on the plane of the line VIII-VIII of FIG. 7.

Connector terminals 2 are arranged inside a connector housing 3 shown in FIG. 7, and adjusting terminals 1 are aligned and arranged in a depressed portion 21 on the upper surface of a fixing flange 10. Therefore, in this embodiment, the characteristic adjustment can be performed after completion of the construction of the thermal type air flow measuring instrument by applying electric signals to the adjusting terminals 1. In an embodiment where the adjusting terminals are arranged in the connector housing, the adjusting terminals 1 are water-proofed and avoid contact with the other parts by attaching the associated connector when it is used in practice. However, since the adjusting terminals 1 are arranged outside the connector housing 3 in this embodiment, the adjusting terminals 1 are exposed even when the associated connector is attached. Therefore, by filling the depressed portion 21 with an adhesive 20 to coat the adjusting terminals 1, the adjusting terminals 1 are water-proofed and avoid contact with the other parts. Instead of using the adhesive 20, a method in which the adjusting terminals are covered with another member can be employed, or a method in which the adjusting terminals are coated with an insulator.

Figure 9:
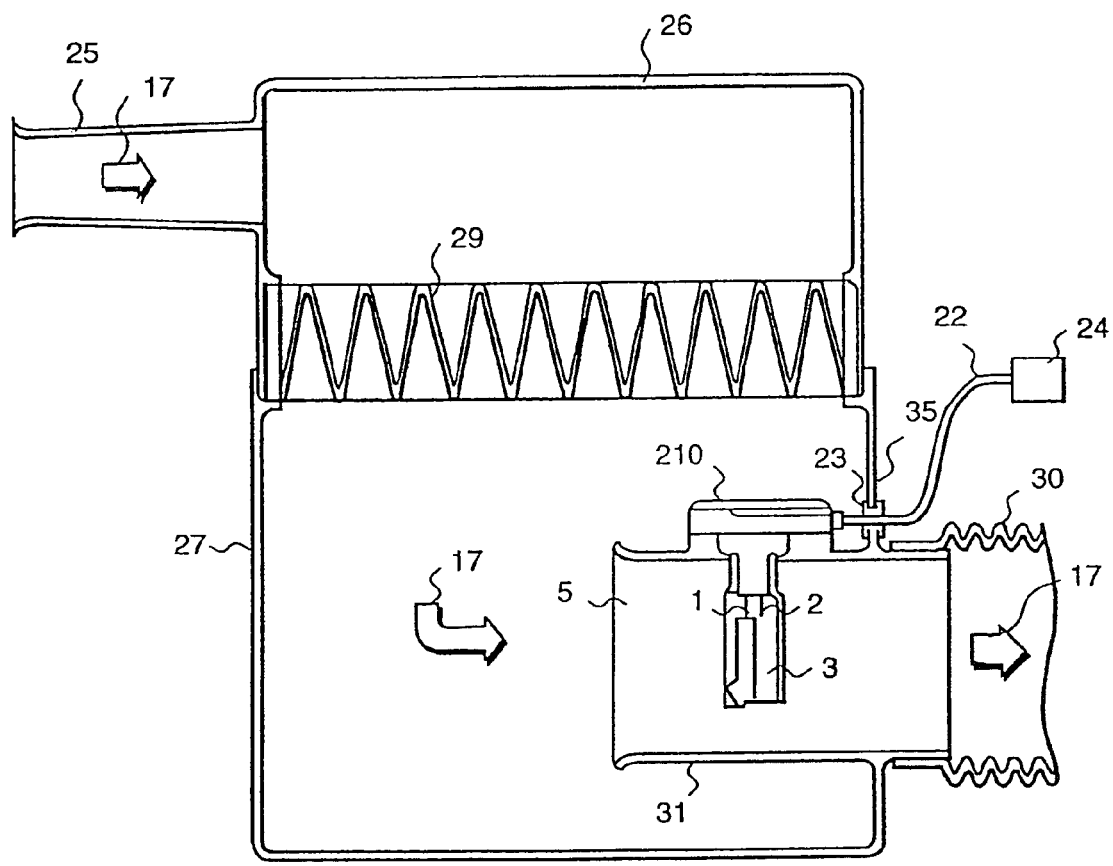
FIG. 9 is a cross-sectional side view showing a further embodiment in accordance with the present invention.

Description will be made below on an embodiment where a sensing device is set in a portion of which the surrounding is closed, referring to FIG. 9 to FIG. 11.

The thermal type air flow measuring instrument 210 is inserted into an inner duct 31 integrated with an air cleaner clean side housing 27 in a unit so that an inlet 13*a* and an outlet 13*b* of an auxiliary passage 13 is positioned in the inner portion of the inner duct 31. An air filter 29 is fixed between the air cleaner clean side housing 27, and an air cleaner dirty side housing 26. An inlet duct 25 is attached in the air cleaner dirty side housing 26, and a connecting duct 30 is attached downstream of the inner duct 31 of the air cleaner clean side housing 27. An internal combustion engine is arranged downstream of the connecting duct 30. Therefore, flow of intake air shown by main flow direction 17 flows into the air cleaner dirty side housing 26 from the inlet duct 25, and then into the inner duct 31 from the air cleaner clean side housing 27 passing through the air filter 29. Here, the inner duct 31 corresponds to the main passage 15 of the thermal type air flow measuring instrument 210, and part of the air flowing through the main passage 15 flows into the auxiliary passage 13 and then into the internal combustion engine through the connecting duct 30.

Figure 10:
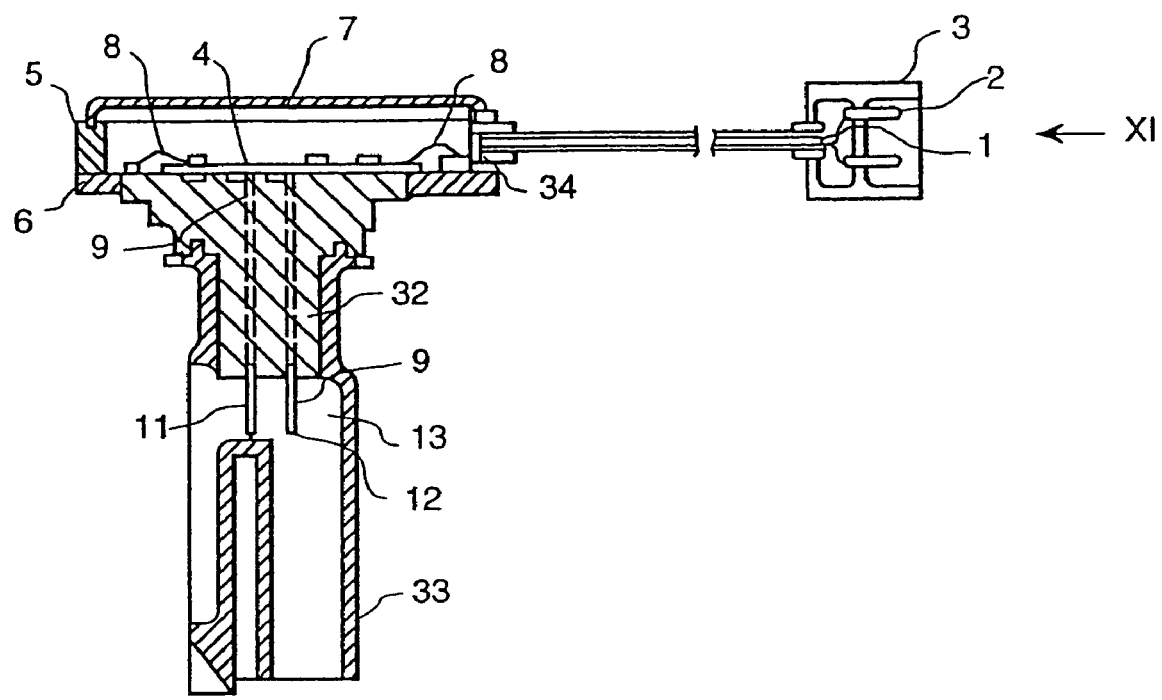
FIG. 10 is a cross-sectional side view showing the sensing device of FIG. 9.
Figure 11:
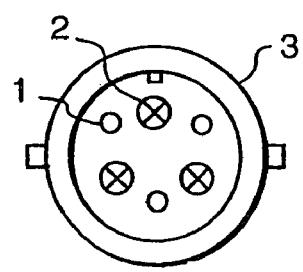
FIG. 11 is an external view showing the sensing device viewed in the direction of the arrow XI of FIG. 10.

In the thermal type air flow measuring instrument 210 shown in FIG. 10, a holder 32 holding a sensing element terminal 9 is integrated with a metallic base 6 in a unit. An auxiliary passage structural member 33 is arranged so that a heating resistor 11 and a temperature compensating resistor 12 are positioned inside the auxiliary passage 13. An electronic circuit 4 is fixed on the upper surface of the metallic base 6, and a housing 5 is also fixed on the upper surface of the metallic base 6 so as to contain the electronic circuit 4. The electronic circuit 4, the sensing element terminal 8 and a lead frame 34 are electrically connected with a metallic wire 8. The lead frame 34 is extended outside the housing 5 to be connected to a wire-harness 22, and a connector 24 is arranged in the opposite end portion of the wire-harness 22. The connector 24 is composed of a connector housing 3 containing connector terminals 2 and adjusting terminals 1. The connector terminals 2 and the adjusting terminals 1 are electrically connected to the electronic circuit 4 through the wire-harness 22, the lead frame 34 and the metallic wires 8. Therefore, as in the above-mentioned embodiment, the characteristic adjustment can be performed by applying an electric signal to the adjusting terminal 1 after fixing the cover 7 onto the housing 5 and the electronic circuit 4 is completely covered.

Further, in this embodiment, although the thermal type air flow measuring instrument 210 is fixed to the inner duct 31 and placed in the air cleaner 200 having the air filter 29 and the air cleaner dirty side housing 26, the connector 24 is led out in the outside of the air cleaner 200. A connector extracting hole 35 of the air cleaner clean side housing 27 seen in FIG. 9 is sealed by a rubber boot 23 provided in the middle of the wire-harness 22. Therefore, according to this embodiment, even after the sensing device, i.e., the thermal type air flow measuring instrument 210, is set in an enclosed place of actual use, that is, the inside of the air cleaner 200, the characteristic adjustment can be performed by applying an electric signal to the adjusting terminal 1 of the connector 24 which has been led outside. Further, the characteristic adjustment can be performed under a state of actual use, that is, after it is installed in the air cleaner 200.

Figure 12:
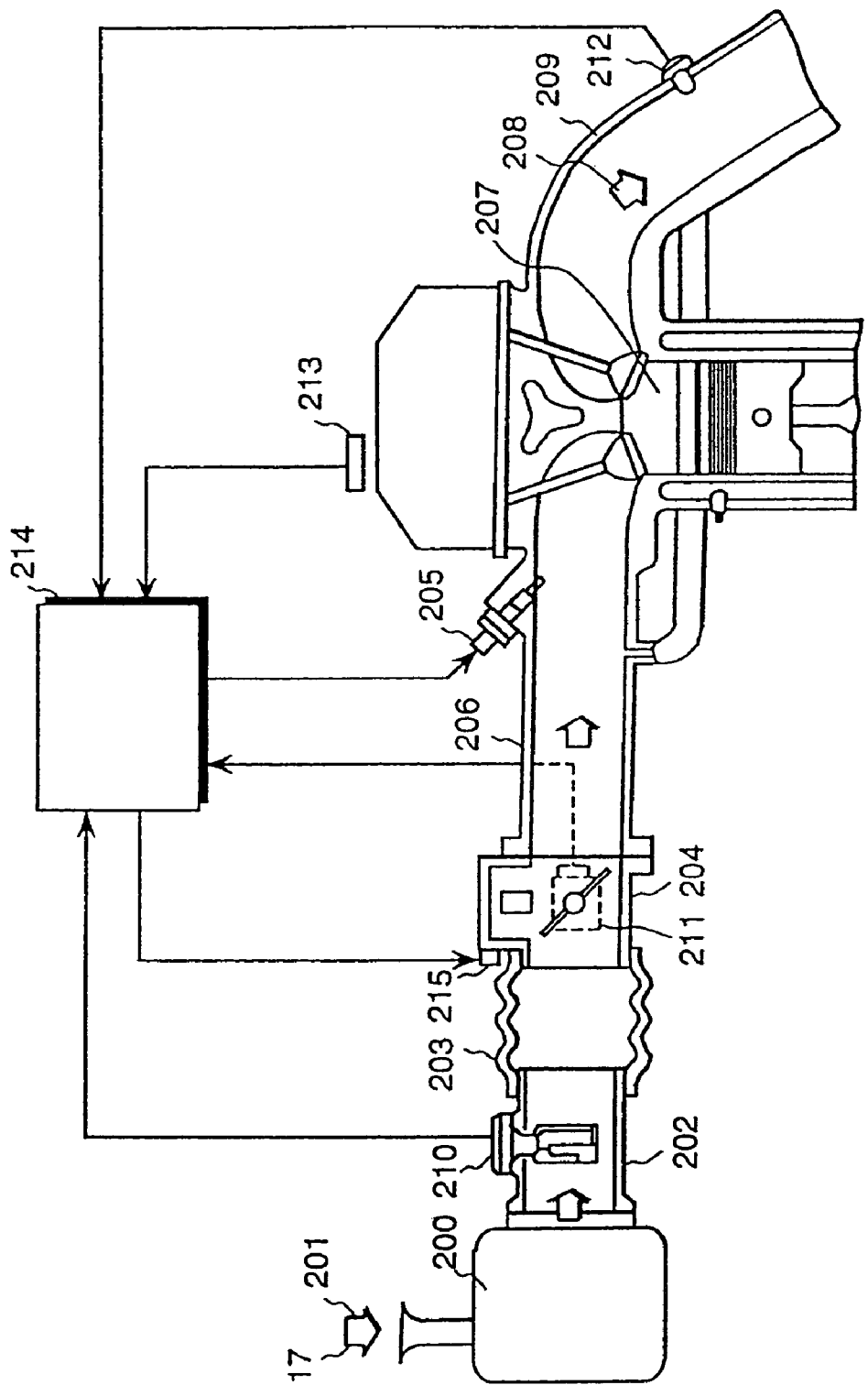
FIG. 12 is a view showing an embodiment of a control system in which the present invention is used.

Finally, description will be made below on an embodiment of an internal combustion engine of electronic control fuel injection type which a thermal type air flow measuring instrument in accordance with the present invention is applied to, referring to FIG. 12.

Intake air 201 entering from an air cleaner 200 is sucked into an engine cylinder 207 though a body 202 of a thermal type air flow measuring instrument, a duct 203 and an intake manifold 206 having a throttle body 204 and an injector 205 for fuel supply. Exhaust gas 208 produced in the engine cylinder 207 is exhausted through an exhaust manifold 209.

An air flow signal output from an electronic circuit of the thermal type air flow measuring instrument 210, a throttle valve opening signal output from a throttle angle sensor 211, an oxygen concentration signal output from an oxygen sensor 212 provided in the exhaust manifold 209 and a rotating speed signal output from an engine rotating speed sensor 213 are input to a control unit 214. The control unit 214 outputs signals such as an idle control valve opening, etc. under an optimum fuel injection rate obtained by calculation processing to control the injector 205 and the idle air control valve 215.

According to the present invention, a highly accurate sensing device can be provided since the characteristic adjustment of the sensing device can be performed in a final process, and accordingly it is possible to prevent a change in the characteristics produced in the processes after the adjustment such as gel filling, cover bonding, thermo-fitting processes in the conventional sensing device. Further, a low-cost sensing device can be provided since the sensing elements and the electronic circuit are integrated to reduce number of the parts, the size and the weight. Also, it is possible to easily perform the characteristic adjustment of the sensing device. Furthermore, a sensing device suitable for the environment of actual use can be provided since the characteristic adjustment can be performed under a state that the sensing device is set in the environment of actual use.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A physical quantity detecting device comprising:
   a detecting element for detecting a physical quantity;
   a circuit electrically connected to said detecting element;
   a housing protecting said circuit in an inside thereof;

a conductor electrically connecting said circuit and exposed outside of said housing, wherein said circuit is adjusted by an electrical signal from the outside of said housing through said conductor.

2. A physical quantity detecting device according to claim 1, wherein a terminal connected to said circuit and to a power source to supply power to said circuit or to the ground to be grounded is provided, a connector opening to the outside of said housing is formed in said housing, said conductor and said terminal are exposed inside said connector.

3. A physical quantity detecting device according to claim 1, wherein said connector has a bottom with a hole or holes at one side and an opening formed at an opposite side to said bottom and opening to the atmosphere, and at least a part of said conductor is disposed in said hole and exposed to the atmosphere.

4. A physical quantity detecting device according to claim 1, wherein an adhesive or an insulating material is coated on said conductor exposed outside said housing.

5. A production method of said physical quantity detecting device according to claim 4, wherein after said circuit is adjusted, said adhesive or insulating material is coated.

6. A physical quantity detecting device comprising:
a detecting element for detecting a physical quantity;
a circuit electrically connected to said detecting element;
a housing protecting said circuit in an inside thereof;
a concave formed outside said housing;
a conductor electrically connecting said circuit and inside of said concave, wherein said circuit is adjusted by an electrical signal applied from the outside of said housing through said conductor.

7. A physical quantity detecting device according to claim 6, wherein an adhesive or an insulating material is coated on said conductor inside said concave.

8. A production method of said physical quantity detecting device according to claim 7, wherein after said circuit is adjusted, said adhesive or insulating material is coated.

9. A physical quantity detecting device according to claim 6, wherein another material covering over said concave is provided.

10. A physical quantity detecting device according to claim 6, wherein a terminal electrically connected to said circuit and supplying power source or ground is provided, a connector is formed in said housing, and
said terminal is exposed inside said connector.

11. A thermal-type air flow measuring instrument:
a detecting element for detecting a physical quantity;
a circuit electrically connected to said detecting element;
a housing protecting said circuit in an inside thereof;
a conductor electrically connecting said circuit and exposed outside of said housing, wherein said circuit is adjusted by an electrical signal from the outside of said housing through said conductor.

12. A thermal-type air flow measuring instrument according to claim 11, wherein a terminal connected to said circuit and supplying a power source to said circuit or supplying ground is provided, a connector opening to the outside of said housing is formed in said housing, said conductor and said terminal are exposed inside said connector.

13. A thermal-type air flow measuring instrument according to claim 11, wherein said connector has a bottom with a hole or holes at one side and an opening formed at an opposite side to said bottom and opening to the atmosphere, and at least a part of said conductor is disposed in said hole and exposed to the atmosphere.

14. A thermal-type air flow measuring instrument according to claim 11, wherein an adhesive or an insulating material is coated on said conductor exposed outside said housing.

15. A thermal-type air flow measuring instrument;
a detecting element for detecting a physical quantity;
a circuit electrically connected to said detecting element;
a housing protecting said circuit in an inside thereof;
a concave formed outside said housing;
a conductor electrically connecting said circuit and inside of said concave, wherein said circuit is adjusted by an electrical signal applied from the outside of said housing through said conductor.

16. A thermal-type air flow measuring instrument according to claim 15, wherein an adhesive or an insulating material is coated on said conductor inside said concave.

17. A production method of said thermal-type air flow measuring instrument according to claim 16, wherein after said circuit is adjusted, said adhesive or insulating material is coated.

18. A thermal-type air flow measuring instrument according to claim 15, wherein another material covering over said concave is provided.

19. A thermal-type air flow measuring instrument according to claim 15, wherein a terminal electrically connected to said circuit and to a power source to supply power to said circuit or to the ground to be grounded is provided, a connector is formed in said housing, and
said terminal is exposed inside said connector.

20. A thermal-type air flow measuring instrument according to claim 15, wherein an internal combustion engine is operatively associated with said detecting element and said circuit.

21. A characteristic adjusting apparatus of a physical quantity sensing device having a sensing element for detecting various physical quantities and an electronic circuit electrically connected to said sensing element for processing a controlled or a detected quantity of aid sensing element as an electric signal, comprising:

an adjusting circuit provided in said electric circuit for performing adjustment of one of output characteristic, a controlled quantity or detected quantity of the sensing element;

a housing for containing said electronic circuit; and
an adjusting terminal electrically connected to said adjusting circuit and provided outside said housing;

wherein the output characteristic, the controlled quantity or detected quantity of said sensing element is adjustable by applying an electric signal to said adjusting terminal, wherein adjusting terminal is arranged inside a connector housing containing therein connector terminals for an output terminal for transmitting an output signal of an said electronic circuit to external equipment, a power source terminal for connecting to an power source or a ground terminal.

22. A characteristic adjusting apparatus according to claim 21, wherein said adjusting terminal is placed at an inner position more remote from an opening end of said connector housing than a position at which a connector terminal is located.

23. A characteristic adjusting apparatus according to claim 22, wherein said adjusting terminal is placed in a hole provided on a bottom of said connector housing.

24. A characteristic adjusting apparatus according to claim 21, wherein connector housing constitutes a waterproof structure for an inside portion of the connector housing with connection of an associating connector.

25. A characteristic adjusting apparatus according to claim 21, wherein said connector housing is a one-piece structure with said housing of said electronic circuit having said connector terminal and said adjusting terminal embedded.

26. A characteristic adjusting apparatus according to claim 21, wherein a multiplexer is operatively arranged between said adjusting circuit and said adjusting terminal.

* * * * *